(12) United States Patent
Ishikawa et al.

(10) Patent No.: US 7,077,781 B2
(45) Date of Patent: Jul. 18, 2006

(54) POWER ROLLER UNIT FOR TOROIDAL-TYPE CONTINUOUSLY VARIABLE TRANSMISSION

(75) Inventors: Kouji Ishikawa, Kanagawa (JP); Eiji Inoue, Kanagawa (JP)

(73) Assignee: NSK Ltd., Tokyo (JP)

( * ) Notice: Subject to any disclaimer, the term of this patent is extended or adjusted under 35 U.S.C. 154(b) by 504 days.

(21) Appl. No.: 10/653,256

(22) Filed: Sep. 3, 2003

(65) Prior Publication Data

US 2004/0116241 A1 Jun. 17, 2004

(30) Foreign Application Priority Data

Sep. 5, 2002 (JP) .............................. 2002-260668

(51) Int. Cl.
*F16H 15/38* (2006.01)

(52) U.S. Cl. ............................. 476/46; 476/42; 476/67

(58) Field of Classification Search .................. 476/40, 476/42, 46, 67
See application file for complete search history.

(56) References Cited

U.S. PATENT DOCUMENTS

| | | | |
|---|---|---|---|
| 6,616,568 B1 * | 9/2003 | Ooyama ...................... | 476/40 |
| 6,945,904 B1 * | 9/2005 | Ishikawa et al. .............. | 476/40 |
| 6,979,277 B1 * | 12/2005 | Ishikawa et al. ............... | 476/8 |
| 7,004,883 B1 * | 2/2006 | Ishikawa et al. .............. | 476/40 |
| 2002/0039948 A1 * | 4/2002 | Ooyama ...................... | 476/40 |
| 2003/0060324 A1 * | 3/2003 | Ishikawa et al. .............. | 476/40 |
| 2003/0134711 A1 * | 7/2003 | Ishikawa et al. .............. | 476/46 |
| 2003/0190994 A1 * | 10/2003 | Ishikawa et al. .............. | 476/46 |
| 2004/0087412 A1 * | 5/2004 | Mori et al. ................... | 476/46 |

FOREIGN PATENT DOCUMENTS

| | | |
|---|---|---|
| JP | 6-41004 (Y2) | 10/1994 |
| JP | 10-30700 (A) | 2/1998 |
| JP | 2001-304366 (A) | 10/2001 |

* cited by examiner

*Primary Examiner*—David Fenstermacher
(74) *Attorney, Agent, or Firm*—Sughrue Mion, PLLC (57) ABSTRACT

A power roller unit for a toroidal-type continuously variable transmission, has: a trunnion including a support plate portion, a pair of bent wall portions, two pivot shafts, and a connecting member; a displacement shaft; a power roller; a thrust ball bearing including an outer ring, a ball, and a retainer; a thrust bearing, wherein the thrust bearing is held by a hold portion disposed in the support plate portion, and wherein, where the distance between the small end face of the power roller and the connecting member is expressed as a, the distance between the outer ring and the opposed surface of the hold portion opposed to the outer ring is expressed as b, and the thickness of the thrust bearing is expressed as c, the sum of a and b is set smaller than c.

5 Claims, 8 Drawing Sheets

POWER ROLLER UNIT FOR TOROIDAL-TYPE CONTINUOUSLY VARIABLE TRANSMISSION

BACKGROUND OF THE INVENTION

1. Field of the Invention

The present invention relates to a power roller unit for a toroidal-type continuously variable transmission.

2. Description of the Related Art

Figure 3:
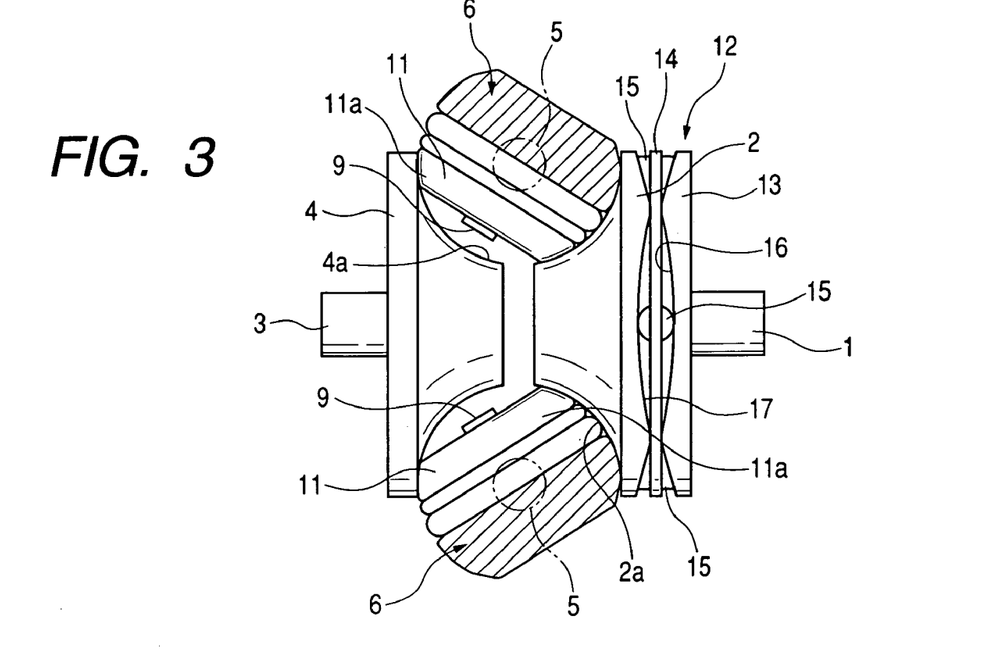
FIG. 3 is a side view of the basic structure of a conventionally known toroidal-type continuously variable transmission, showing its maximum speed reducing state.
Figure 4:
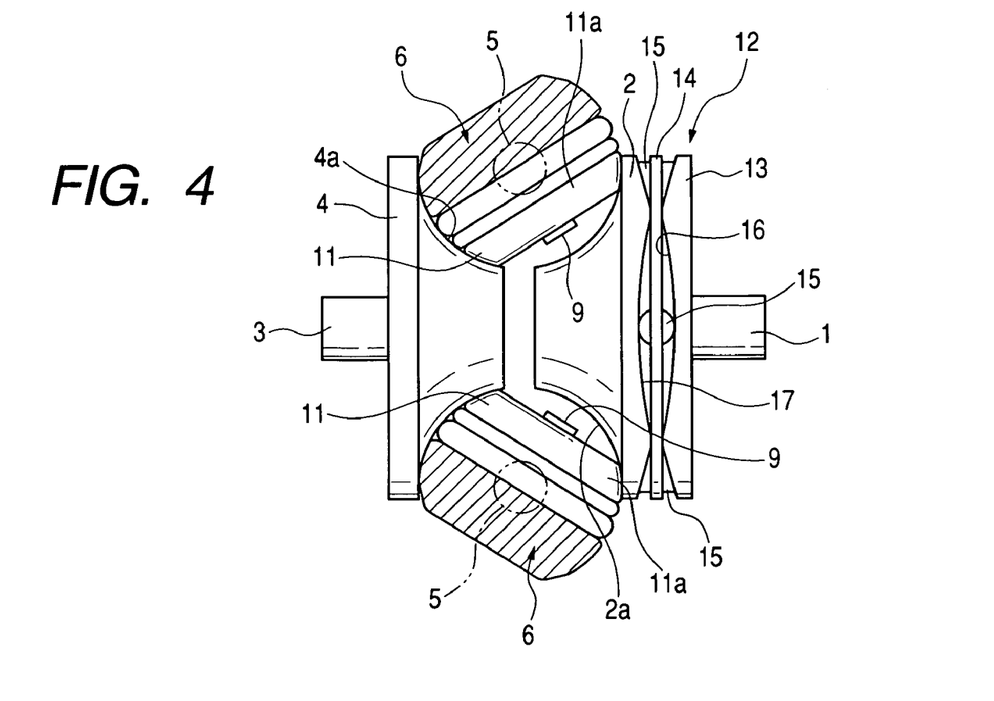
FIG. 4 is a side view of the basic structure of a conventionally known toroidal-type continuously variable transmission, showing its maximum speed increasing state.

It has been enforced in part of the car industry to use such a toroidal-type continuously variable transmission as shown in FIGS. 3 and 4 as a transmission for a car. In this toroidal-type continuously variable transmission, an input side disk 2 is supported concentrically with an input shaft 1 and an output side disk 4 is fixed to the end portion of an output shaft 3 which is disposed concentrically with the input shaft 1. In the interior of a casing in which the toroidal-type continuously variable transmission is stored, there are disposed trunnions 6, 6 which can be swung about their respective pivot shafts 5, 5 disposed at positions twisted with respect to the input shaft 1 and output shaft 3.

Figure 5:
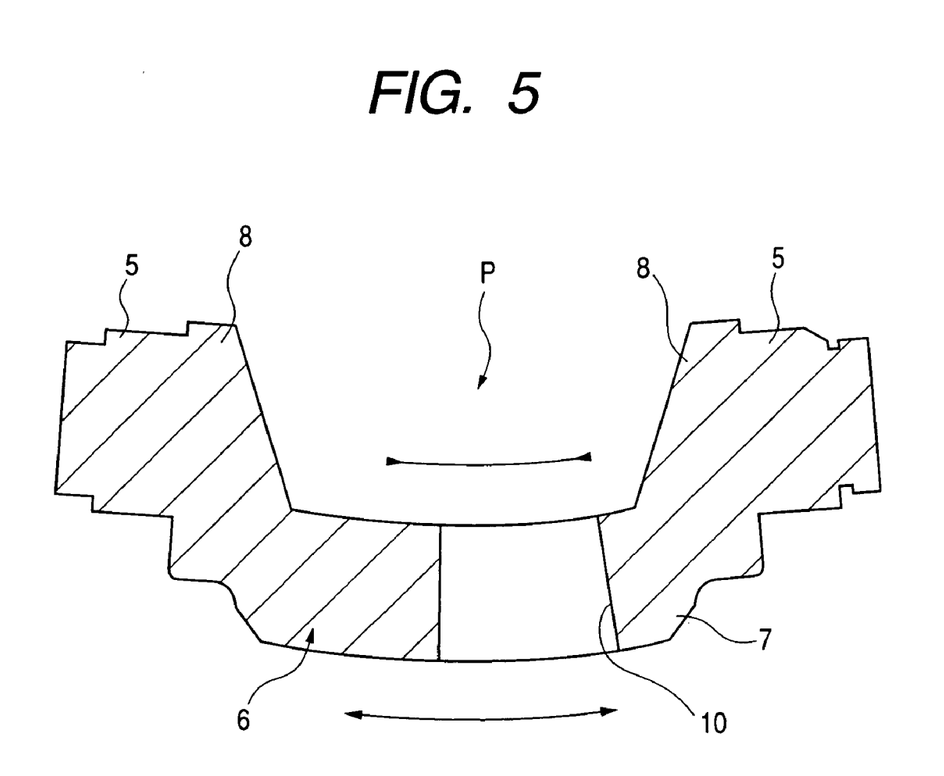
FIG. 5 is a section view of the concrete shape of a trunnion, showing a state thereof in which it is elastically deformed due to a thrust load applied thereto.
Figure 7:
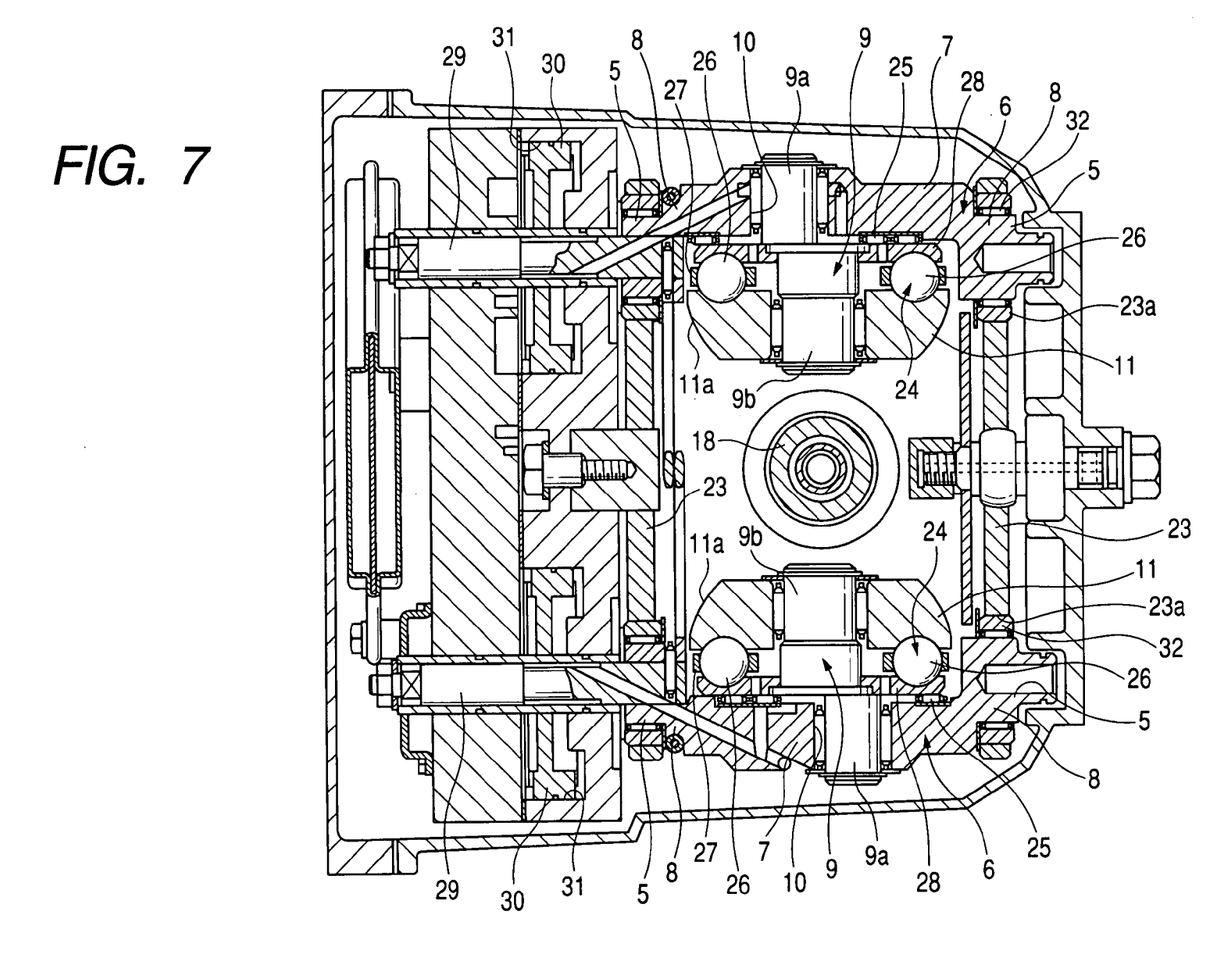
FIG. 7 is a section view taken along the line X—X shown in FIG. 6.

That is, each of the trunnions 6, 6, as shown in FIG. 5 and FIG. 7 which will be discussed later, includes a pair of bent wall portions 8, 8 respectively formed in the longitudinal-direction (in FIGS. 5 and 7, in the right and left direction) two end portions of a support plate portion 7 constituting the trunnion 6 in such a manner that they are curved to the inner surface side (in FIG. 5, left side) of the support plate portion 7. And, due to the two bent wall portions 8, 8, in the trunnion 6, there is formed a recess-shaped pocket portion P for storing a power roller 11 (which will be discussed later) therein. Also, on the outer surfaces of the respective bent wall portions 8, 8 (on the opposite surfaces thereof to the support plate portion 7), there are disposed their associated pivot shafts 5, 5 in such a manner that they are concentric with each other.

In the middle portion of the support plate portion 7, there is formed a circular hole 10, while the base end portion of a displacement shaft 9 is supported in the circular hole 10. And, in case where the trunnions 6, 6 are swung about their respective pivot shafts 5, 5, the inclination angles of the displacement shafts 9, 9 supported on the middle portions of the trunnions 6, 6 can be adjusted. Also, on the peripheries of the leading end portions of displacement shafts 9, 9 projected from the inner surfaces of their respective support plate portions 7, 7, there are rotatably supported power rollers 11, 11; and, the power rollers 11, 11 are interposed between and held by the input side and output side disks 2, 4. By the way, the base end portions and leading end portions of the respective displacement shafts 9, 9 are formed eccentric to each other.

The sections of the mutually opposing inner surfaces 2a, 4a of the input side and output side disks 2, 4 are respectively formed as concave surfaces which can be obtained by rotating an arc the center of which is the pivot shaft 5 or by rotating a curved line near to such arc. And, the peripheral surfaces 11a, 11a (which are respectively formed as spherical-shaped convex surfaces) of the respective power rollers 11, 11 are contacted with the respective inner surfaces 2a, 4a.

Between the input shaft 1 and input side disk 2, there is interposed a pressing device 12 of a loading cam type. This pressing device 12 presses the input side disk 2 toward output side disk 4 elastically. Also, the pressing device 12 is composed of a cam plate 13 rotatable together with the input shaft 1 and a plurality of (for example, four) rollers 15, 15 respectively held by a retainer 14. Also, in one side surface (in FIGS. 3 and 4, the left side surface) of the cam plate 13, there is formed a cam surface 16, that is, an uneven surface which extends in the peripheral direction of such one side surface; and, also in the outer surface (in FIGS. 3 and 4, the right side surface) of the input side disk 2, there is formed a similar cam surface 17. And, the plurality of rollers 15, 15 are supported in such a manner that they can be rotated about axes which extend in the radial direction with respect to the input shaft 1.

In the thus-structured toroidal-type continuously variable transmission, in case where the input shaft 1 is rotated, with the rotation of the input shaft 1, the cam plate 13 is rotated and thus the cam surface 16 presses the plurality rollers 15, 15 against the cam surface 17 formed in the outer surface of the input side disk 2. As a result of this, not only the input side disk 2 is pressed against the plurality of power rollers 11, 11 but also, due to the mutual pressing between the pair of cam surfaces 16, 17 and the plurality of rollers 15, 15, the input side disk 2 is rotated. And, the rotation power of the input side disk 2 is transmitted through the power rollers 11, 11 to the output side disk 4, thereby being able to rotate the output shaft 3 fixed to the output side disk 4.

To change the rotation speed between the input shaft 1 and output shaft 3, specifically, to reduce the rotation speed between the input shaft 1 and output shaft 3, the trunnions 6, 6 may be respectively swung about their associated pivot shafts 5, 5 and the displacement shafts 9, 9 may be thereby inclined so that the peripheral surfaces 11a, 11a of the power rollers 11, 11, as shown in FIG. 3, can be contacted with the near-to-center portion of the inner surface 2a of the input side disk 2 and the near-to-outer-periphery portion of the inner surface 4a of the output side disk 4.

On the other hand, to increase the rotation speed between the input shaft 1 and output shaft 3, the trunnions 6, 6 may be respectively swung and the displacement shafts 9, 9 may be thereby inclined so that the peripheral surfaces 11a, 11a of the power rollers 11, 11, as shown in FIG. 4, can be contacted with the near-to-outer-periphery portion of the inner surface 2a of the input side disk 2 and the near-to-center portion of the inner surface 4a of the output side disk 4. In case where the inclination angles of the displacement shafts 9, 9 are set in the intermediate angles between the inclination angles shown in FIGS. 3 and 4, there can be obtained an intermediate transmission ratio between the input shaft 1 and output shaft 3.

Figure 6:
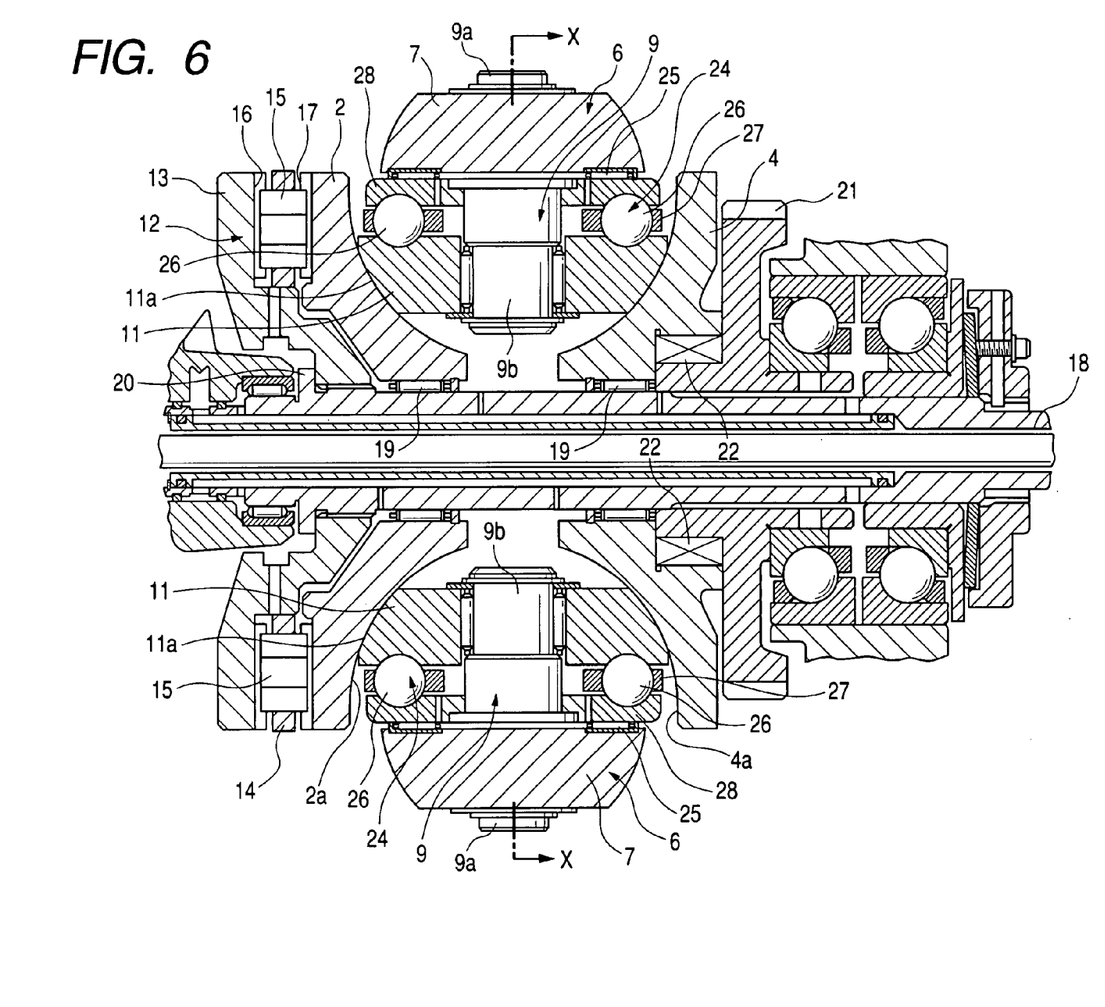
FIG. 6 is a section view of an example of the concrete structure of a conventionally known toroidal-type continuously variable transmission.

Further, FIGS. 6 and 7 show a conventionally known toroidal-type continuously variable transmission. In this toroidal-type continuously variable transmission, an input side disk 2 and an output side disk 4 are respectively supported on the periphery of a circular-pipe-shaped input shaft 18 in such a manner that they can be rotated as well as can be shifted in the axial direction through their associated needle roller bearings 19, 19. Also, a cam plate 13, which constitutes a pressing device 12 of a loading cam type, is spline engaged with the outer peripheral surface of the end portion (in FIG. 6, the left end portion) of the input shaft 18; and, a flange portion 20 prevents the cam plate 13 from moving in the direction to part away from the input side disk 2. Also, an output gear 21 is connected to the output side disk 4 by keys 22, 22, while the output side disk 4 and output gear 21 can be rotated in synchronization with each other.

On the two end portions of each of a pair of trunnions 6, 6 having such a structure as shown in the previously discussed FIG. 5, there are disposed pivot shafts 5, 5; and, these pivot shafts 5, 5 are supported in such a manner that they can be swung with respect to a pair of support plates 23, 23 and can be shifted in the axial direction (in FIG. 6, in the front and back direction; and, in FIG. 7, in the right and left direction) with respect to the support plates 23, 23. That is, the pivot shafts 5, 5 are respectively supported inside support holes 23a formed in the support plates 23, 23 by their associated radial needle roller bearings 32. And, in circular holes 10 which are respectively formed in the middle portions of the support plate portions 7, 7 of the trunnions 6, 6, there are rotatably supported the base end portions 9a of displacement shafts 9 structured such that their base end portions 9a and leading end portions 9b are arranged in parallel to each other and are eccentric to each other. Also, on the peripheries of the leading end portions 9b, 9b of the respective displacement shafts 9, 9 that are projected from the inner surfaces of their associated support plate portions 7, 7, there are rotatably supported power rollers 11, 11.

By the way, a pair of displacement shafts 9, 9, which are disposed on each pair of trunnions 6, 6, are situated at positions on the 180-degree opposite side to each other with respect to the input shaft 18. Also, the direction, in which the leading end portions 9b of the displacement shafts 9, 9 are eccentric to their associated base end portions 9a, is the same direction (in FIG. 7, in the reversed right and left direction) with respect to the rotation direction of the input side and output side disks 2, 4. And, the eccentric direction is substantially perpendicular to the mounting direction of the input shaft 18. Therefore, the power rollers 11, 11 are supported in such a manner that they can be shifted slightly in the longitudinal direction of the input shaft 18. As a result of this, even in case where the power rollers 11, 11 tend to shift in the axial direction of the input shaft 18 due to the elastic deformation of the respective composing parts of the toroidal-type continuously variable transmission caused by thrust loads generated by the pressing device 12, such shifting motion of the power rollers 11 can be absorbed with no unreasonable forces being applied to the composing parts.

Also, between the outer surfaces of the respective power rollers 11, 11 and the inner surfaces of the support plate portions of the respective trunnions 6, 6, there are interposed thrust ball bearings 24 and thrust needle roller bearings 25, both of which belong to thrust rolling bearings, sequentially in the order starting at and from the outer surface side of the power roller 11. Of these bearings, the thrust ball bearings 24, while supporting thrust-direction loads applied to the respective power rollers 11, allow these power rollers 11 to rotate. Each of the thrust ball bearings 24 is composed of a plurality of balls 26, 26, a circular-ring-shaped retainer 27 for holding these balls 26, 26 in a rollable manner, and a circular-ring-shaped outer ring 28. Also, the inner raceways of the respective thrust ball bearings 24 are formed in the outer surfaces of the respective power rollers 11, while the outer raceways thereof are formed in the inner surfaces of the respective outer rings 28.

Also, the thrust needle roller bearings 25 are respectively held by and between the inner surfaces of the support plate portions 7, 7 and the outer surfaces of the outer rings 28. These thrust needle roller bearings 25, while supporting thrust loads applied to the outer rings 28 from the power rollers 11, 11, allow the power rollers 11, 11 and outer rings 28 to be swung and shifted about the centers of the base end portions 9a of the displacement shafts 9.

Further, to the one-end portions (in FIG. 7, the left end portions) of the respective trunnions 6, 6, there are connected drive rods 29; and, to the outer peripheral surfaces of the middle portions of the respective drive rods 29, there are fixed drive pistons 30 respectively. And, the drive pistons 30 are respectively oil-tight fitted into their associated drive cylinders 31.

In the case of the thus-structured toroidal-type continuously variable transmission, the rotation power of the input shaft 18 is transmitted through the pressing device 12 to the input side disk 2. And, the rotation power of the input side disk 2 is transmitted through the pair of power rollers 11, 11 to the output side disk 4 and further the rotation power of the output side disk 4 is taken out from the output gear 21.

To change the rotation speed ratio between the input shaft 18 and output gear 21, the pair of drive pistons 30, 30 may be shifted in the mutually opposite directions. As the drive pistons 30, 30 are shifted, the pair of trunnions 6, 6 are shifted in the mutually opposite directions. For example, the power roller 11 shown on the lower side in FIG. 7 is shifted to the right in FIG. 7, whereas the power roller 11 on the upper side in FIG. 7 is shifted to the left in FIG. 7. This changes the directions of tangential-direction forces that are applied to the contact portions between the peripheral surfaces 11a, 11a of the power rollers 11, 11 and the inner surfaces 2a, 4a of the input side disk 2 and output side disk 4. With such change in the directions of the tangential-direction forces, the trunnions 6, 6 are caused to swing in the mutually opposite directions about their associated pivot shafts 5, 5 which are pivotally supported on the support plates 23, 23.

As a result of this, as shown in the previously discussed FIGS. 3 and 4, the contact positions between the peripheral surfaces 11a, 11a of the power rollers 11, 11 and the inner surfaces 2a, 4a are changed, thereby changing the rotation speed ratio between the input shaft 18 and output gear 21. Also, in case where the torque to be transmitted between the input shaft 18 and output gear 21 is varied and the elastic deformation amounts of the respective composing parts of the toroidal-type continuously variable transmission are thereby varied, the respective power rollers 11, 11 and the outer rings 28 belonging to these power rollers 11 are slightly rotated about the base end portions 9a of their associated displacement shafts 9. Such rotational movements of the power rollers 11 and outer rings 28 are made smoothly, because the thrust needle roller bearings 25 are respectively interposed between the outer surfaces of the outer rings 28 and the inner surfaces of the support plate portions 7, 7 of the trunnions 6, 6. Therefore, as has been described before, there is required only a small force to change the inclination angles of the respective displacement shafts 9, 9.

When the above-structured toroidal-type continuously variable transmission is in operation, thrust loads are applied to the power rollers 11, which are rotatably supported on the inner surface sides (pocket portion P sides) of the respective trunnions 6, 6, from the inner surfaces 2a, 4a of the input side and output side disks 2, 4. And, these thrust loads are transmitted through the thrust ball bearings 24 and thrust needle roller bearings 25 to the inner surfaces of the respective trunnions 6, 6. Therefore, when the toroidal-type continuously variable transmission is in operation, the respective trunnions 6, 6, as shown exaggeratedly in FIG. 5, are elastically deformed only slightly in the direction where the inner surface sides of the trunnions 6 with the power rollers 11 disposed thereon provide concave surfaces.

And, in case where the elastic deforming amounts of the trunnions 6 increase, the thrust loads, which are applied to the balls 26, 26 serving as rolling bodies constituting the thrust ball bearings 24 and needle rollers constituting the thrust needle roller bearings 25, become uneven. That is, as the result of the elastic deformation of the respective trunnions 6, 6, the distances between the inner surfaces of the support plate portions 7, 7 of the respective trunnions 6 and the outer surfaces of the respective power rollers 11 become uneven. And, the thrust loads, which are applied to the rolling bodies existing in the portions where the distances between the trunnions inner surfaces and power roller outer surfaces are increased, are reduced; whereas, the thrust loads, which are applied to the rolling bodies existing in the portions where the distances are decreased, are increased. As a result of this, excessively large thrust loads are applied to some of the rolling bodies and thus the contact pressures between these rolling bodies and raceway surfaces with which the rolling surfaces of these rolling bodies are contacted become excessively large, which shortens greatly the fatigue lives of these rolling surfaces and raceway surfaces.

Figure 8:
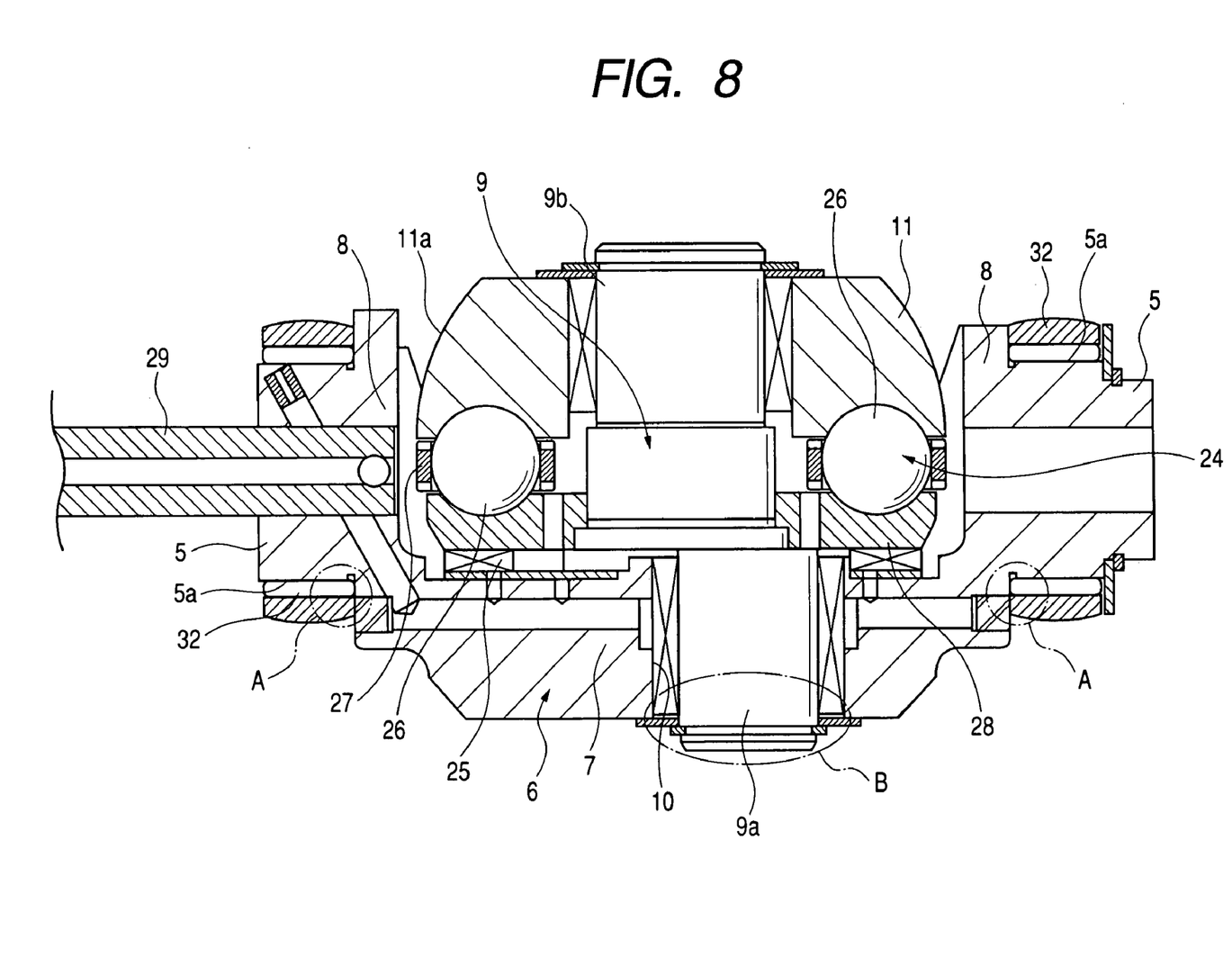
FIG. 8 is an enlarged section view of the conventional structures of a trunnion and a power roller; and, FIG. 9 is an enlarged section view of a conventional power roller unit for a toroidal-type continuously variable transmission.

Also, stresses are easy to concentrate on the connecting portions A (see FIG. 8) between the pivot shafts 5, 5 serving as the rolling surfaces of inclined rolling bearings disposed on the two end portions of their associated trunnion 6 and the trunnion 6 for supporting the power roller 11; and, therefore, in case where an excessive large torque is input and thus, as described above, the trunnion 6 is elastically deformed, damage such as a crack can occur easily in the connecting portions A. In view of this, conventionally, there has been employed a structure in which the thickness of the trunnion 6 is increased to thereby prevent occurrence of such damage. However, this structure is not preferred, not only because the structure increases in size and weight but also because the cost thereof increases. Also, it is necessary to connect together the pivot shafts 5 and trunnion 7 with a radius greater than necessary, which raises a working problem.

Also, in case where the trunnion 6 is elastically deformed in such a manner as shown in FIG. 5, the displacement shaft 9 is inclined with respect to the trunnion 6. In this case, stresses concentrate on the engaged portion B (see FIG. 8) between the base end portion 9a of the displacement shaft 9 and trunnion 6, so that damage such as a crack is easy to occur in this portion. Also, in case where the displacement shaft 9 is inclined with respect to the trunnion 6, the position of the power roller 11 supported on the leading end portion 9b of the displacement shaft 9 is shifted so that the contact points between the peripheral surfaces 11a of the power rollers 11 and the inner surfaces 2a, 4a of the respective disks 2, 4 are shifted from their given positions, which in turn causes the transmission operation of the toroidal-type continuously variable transmission to be unstable.

Figure 9:
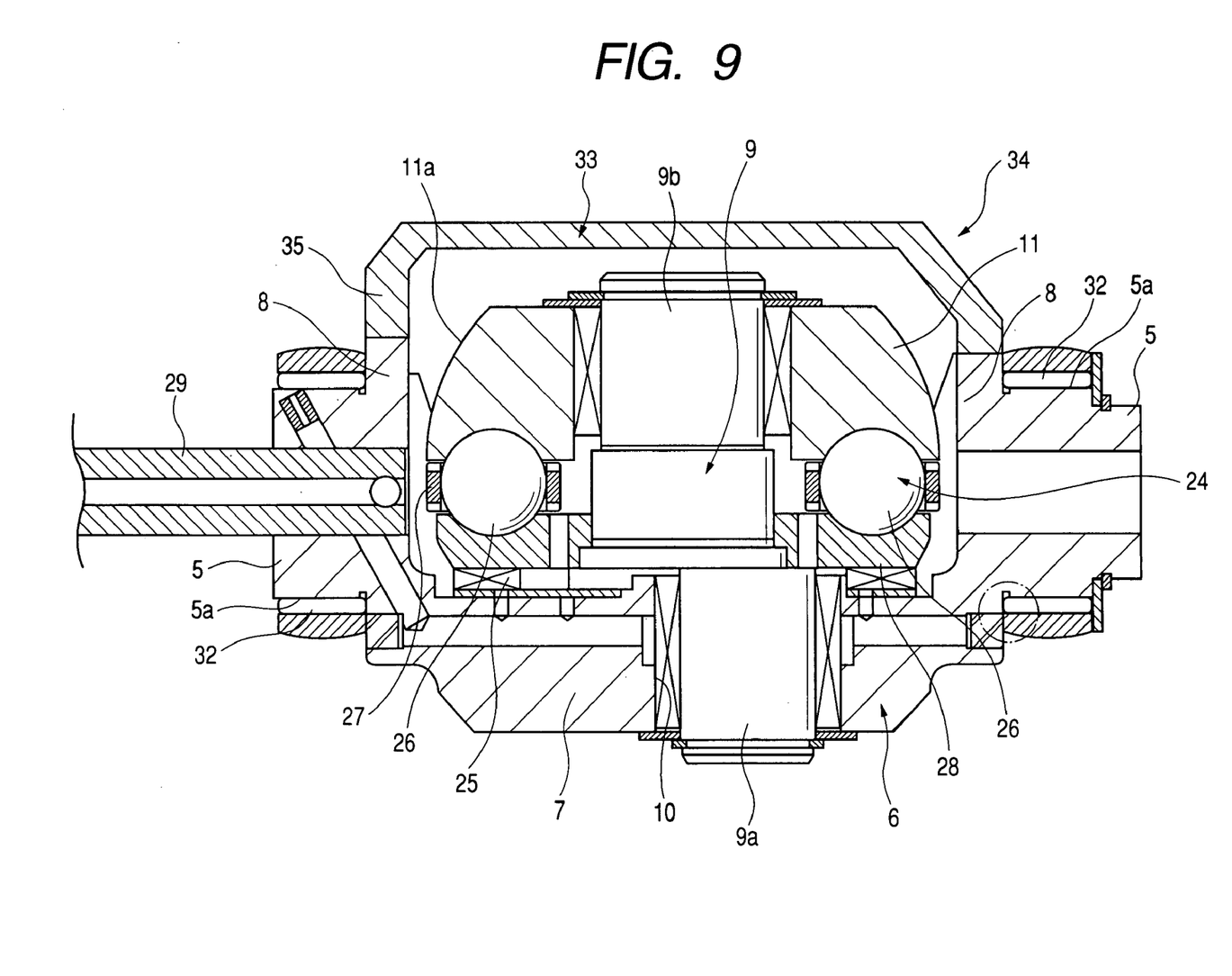

To avoid the above drawbacks, in JP-A-2001-304366, there is proposed a technology in which, as shown in FIG. 9, on the inner surface side of the support plate portion 7 of a trunnion 6 on which a power roller 11 is situated, there is disposed a connecting member 33 which is used to connect together the leading end portions of a pair of bent wall portions 8, 8; and, the connecting member 33 is also used to restrict the trunnion 6 from being elastically deformed in the direction where the inner surface side of the support plate portion 7 of the trunnion 6 provides a concave surface.

In the thus-structured toroidal-type continuously variable transmission, a power roller unit 34 for the toroidal-type continuously variable transmission can be structured in the following manner; that is, after a displacement shaft 9, the power roller 11, a thrust ball bearing 24 and a thrust needle roller bearing 25 are assembled to the trunnion 6, the connecting member 33 is connected and fixed to the bent wall portions 8, 8 of the trunnion 6 by a fastening member such as a pin.

However, in the case of the above-mentioned conventional power roller unit 34, when assembling the power roller unit 34 into the toroidal-type continuously variable transmission, in case where the power roller 11 and outer ring 28 are moved toward the connecting member 33, there is a fear that the thrust needle roller bearing 25 can slip off from between the outer ring 28 and trunnion 6. This raises a problem that the toroidal-type continuously variable transmission incorporating such power roller unit 34 therein is poor in assembling efficiency.

Also, in case where the power roller unit 34 is assembled to the toroidal-type continuously variable transmission with the thrust needle roller bearing 25 remaining slipped off, the contact points between the power rollers 11 and the inner surfaces 2a, 4a of the respective disks 2, 4 are shifted and the transmission operation of the toroidal-type continuously variable transmission is thereby made unstable, which lowers the efficiency of the power transmission; and, in the worst case, the power transmission is impossible.

SUMMARY OF THE INVENTION

The present invention aims at eliminating the drawbacks found in the conventional power roller unit for a toroidal-type continuously variable transmission. Accordingly, it is an object of the present invention to provide a power roller unit for a toroidal-type continuously variable transmission which not only can enhance the assembling efficiency of a toroidal-type continuously variable transmission but also can prevent the efficiency of the power transmission in the power roller unit from being lowered.

In attaining the above object, according to first aspect of the present invention, there is provided a power roller unit for a toroidal-type continuously variable transmission, having: a trunnion including a support plate portion, a pair of bent wall portions formed in the two end portions of the support plate portion, two pivot shafts concentrically disposed on the outer surfaces of the two bent wall portions, and a connecting member for connecting together the pair of bent wall portions; a displacement shaft supported on the support plate portion; a power roller including a large end face and a small end face and supported rotatably on the displacement shaft; a thrust ball bearing including an outer ring interposed between the large end face of the power roller and the support plate portion, a plurality of ball interposed between the large end face of the power roller and the outer ring, and a retainer for holding the balls therein; a thrust bearing interposed between the outer ring and the support plate portion and, while supporting a thrust-direction load applied to the trunnion from the power roller, allowing the power roller to swing, wherein the thrust bearing is held by a hold portion disposed in the support plate portion, and wherein, where the distance between the small end face of the power roller and the connecting member is expressed as a, the distance between the outer ring and the opposed surface of the hold portion opposed to the outer ring is expressed as b, and the thickness of the thrust bearing is expressed as c, the sum of a and be is set smaller than c.

According to the present invention, since the sum of the distance a between the small end face of the power roller and connecting member and the distance b between the outer surface of the outer ring and hold portion is set smaller than the thickness c of the thrust bearing (a+b<c), in assembling the power roller unit into the toroidal-type continuously variable transmission, even in case where the power roller and outer ring are moved toward the connecting member to thereby increase the distance b between the outer surface of the outer ring and hold portion, the distance b is prevented from exceeding the thickness of the thrust bearing, thereby being able to prevent the thrust bearing from slipping off from between the outer ring and trunnion. Thanks to this, not only the assembling efficiency of the toroidal-type continuously variable transmission can be enhanced but also the efficiency of the power transmission in the power roller unit can be prevented from lowering.

Also, since the thrust bearing is prevented against slippage, in transportation of the power roller unit, there can be eliminated the need for provision of a member which prevents the thrust bearing against slippage, thereby being able to reduce the transportation cost of the power roller unit.

According to a second aspect of the present invention, there is provided a power roller unit for a toroidal-type continuously variable transmission as set forth in the first aspect, wherein the distance a is set larger than the distance b. Also, according to the present invention, because the distance a between the small end face of the power roller and connecting member is set larger than the distance b between the outer surface of the outer ring and hold portion (a>b), the space between the small end face of the power roller and connecting member can be widened. This can improve the flow of lubricating oil, which makes it possible to enhance the efficiency of the power transmission in the power roller unit.

According to a third aspect of the present invention, there is provided a power roller unit for a toroidal-type continuously variable transmission as set forth in the first aspect, wherein the connecting member includes a projecting portion projecting toward the small end face of the power roller.

Further, according to the present invention, since, in the connecting member, there is disposed a projecting portion which projects toward the small end face of the power roller, the space between the small end face of the power roller and the other portions of the connecting member than the projecting portion can be widened, which can improve the flow of lubricating oil around the power roller rotating at a high speed and thus can enhance the efficiency of the power transmission in the power roller unit.

According to a fourth aspect of the present invention, there is provided a power roller unit for a toroidal-type continuously variable transmission as set forth in the third aspect, wherein the projecting portion of the connecting member is disposed at a position opposed to the center portion of the rotation of the power roller.

In addition, according to the present invention, because the projecting portion of the connecting member is disposed at a position which is opposed to the center portion of the rotation of the power roller, there can be provided a wider space between the outer peripheral portion of the small end face of the power roller and connecting member, which can improve the flow of lubricating oil around the power roller further and thus can enhance the efficiency of the power transmission further.

According to a fifth aspect of the present invention, there is provided a power roller unit for a toroidal-type continuously variable transmission as set forth in the first aspect, wherein the outer ring is formed integrally with the displacement shaft.

DETAILED DESCRIPTION OF THE PREFERRED EMBODIMENTS

Now, description will be given below of the mode for carrying out the present invention with reference to the accompanying drawings. By the way, in the following drawings, like composing elements as those shown in FIGS. 3 to 9 are given the same designations and thus the description thereof is simplified.

Figure 1:
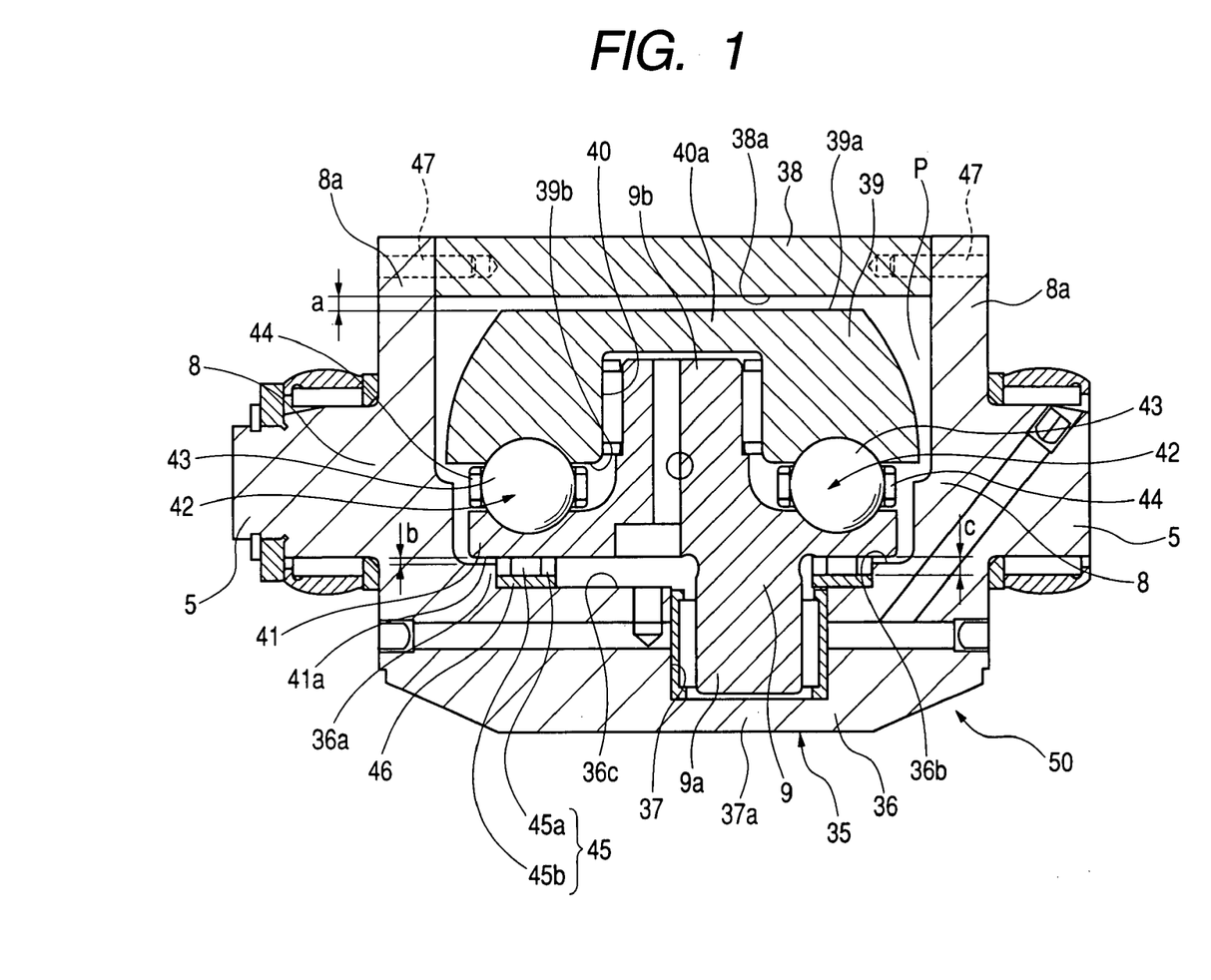
FIG. 1 is a section view of a power roller unit for a toroidal-type continuously variable transmission according to a first embodiment of the present invention.

FIG. 1 shows a first embodiment of a power roller unit for a toroidal-type continuously variable transmission according to the present invention. As shown in FIG. 1, a power roller unit 50 for a toroidal-type continuously variable transmission according to the present embodiment comprises a trunnion 35, a displacement shaft 9, a power roller 39, a thrust ball bearing 42, and a thrust needle roller bearing 45.

The trunnion 35 includes, in the longitudinal-direction (in FIG. 1, in the right-and-left direction) two end portions of a support plate portion 36 which constitutes the present trunnion 35, a pair of bent wall portions 8, 8 respectively formed in such a manner that they are curved toward the inner surface side (in FIG. 1, the upper side) of the support plate portion 36. And, on the outer surfaces of the respective bent wall portions 8, 8, there are disposed pivot shafts 5, 5 in such a manner that they are concentric with each other.

Also, in the support plate portion 36, there is formed a bottomed support hole 37 which is used to support the base end portion 9*a* of the displacement shaft 9 in a rotatable manner. That is, on the side of the support hole 37 that is opposite to an outer ring 41 (which will be discussed later), there is disposed a bottom plate portion 37*a* in such a manner that it is integral with the support plate portion 36; and, the opening of the support hole 37 is closed by the bottom plate portion 37*a*.

Also, in the trunnion 35, on the inner surface side (pocket portion P side) of the support plate portion 36 where the power roller 39 is situated, there is disposed a connecting member 38 which is used to restrict the trunnion 35 from being elastically deformed in the direction where the inner surface side of the support plate portion 36 provides a concave surface. The connecting member 38 extends in such a manner that it is set between and over the leading end portions 8a, 8a of the pair of bent wall portions 8, 8. The connecting member 38 is situated within the pocket portion P and, when it is contacted with the inner surface of the pocket portion P in a direction substantially perpendicular to the thrust direction, receives a pressing force which acts so as to press and crush the pocket portion P. By the way, the connecting member 38 can be formed in a linear manner by enforcing a working operation such as a forging operation, which can provide large rigidity, on a material having sufficient rigidity such as steel.

In the power roller 39, there is formed a bottomed insertion hole 40 for insertion of the leading end portion 9b of the displacement shaft 9. That is, on the opposite side of the insertion hole 40 to the outer ring 41, there is formed a bottom plate portion 40a integrally with the power roller 39, while the opening of the insertion hole 40 is closed by the bottom plate portion 40a.

Also, between the large end face 39b of the power roller 39 and the inner surface of the support plate portion 36, there is interposed the outer ring 41 integrally with the displacement shaft 9, while the outer ring 41 cooperates with the power roller 39 in holding balls (rolling bodies) 43, which are held by a circular-ring-shaped retainer 44, between them. And, the balls 43, retainer 44 and outer ring 41 cooperate together in constituting the thrust ball bearing 42.

And, between the outer surface 41a of the outer ring 41 and the inner surface of the support plate portion 36, there is interposed the thrust needle roller bearing (thrust bearing) 45 which, while supporting loads applied to the outer ring 41 from the power roller 39, allows the power roller 39 and outer ring 41 to swing and shift about the base end portion 9a of the displacement shaft 9. This thrust needle roller bearing 45 is composed of a retainer 45a and a needle roller 45b, while the outer periphery of the thrust needle roller bearing 45 is held on a stepped portion (a hold portion) 36a formed in the inner surface of the support plate portion 36. Also, a race (a receive seat) 46 for receiving the thrust needle roller bearing 45 is mounted on the bottom surface of a recessed portion 36c formed in the inner surface of the support plate portion 36.

In the present power roller unit 50, the sum of the distance a between the small end face 39a of the power roller 39 and the inner surface 38a of the connecting member 38 and the distance b between the outer surface 41a of the outer ring 41 and the opposed surface 36b of the stepped portion 36a opposed to the outer ring 41 is set smaller than the thickness c of the thrust needle roller bearing 45 (a+b<c). Further, the distance a is set larger than the distance b (a>b).

In the thus-structured power roller unit 50 for a toroidal-type continuously variable transmission, after the displacement shaft 9, power roller 39, thrust ball bearing 42 and thrust needle roller bearing 45 are assembled to the trunnion 35, the two ends of the connecting member 38 are fixed to the respective leading end portions 8a, 8a of the two bent wall portions 8, 8 of the trunnion 6 by fastening members 47 like pins, thereby completing the assembly of the present power roller unit 50.

In the power roller unit 50 for a toroidal-type continuously variable transmission, the distance a between the small end face 39a of the power roller 39 and the inner surface 38a of the connecting member 38, the distance b between the outer surface 41a of the outer ring 41 and the opposed surface 36 of the stepped portion 36a, and the thickness c of the thrust needle roller bearing 45 are set so as to have the relation, that is, (a+b<c) between them; and, therefore, when assembling the power roller unit 50 into a toroidal-type continuously variable transmission, even in case where the power roller 39 is moved together with the outer ring 41 toward the connecting member 38 to thereby increase the distance b between the outer surface 41a of the outer ring 41 and the opposed surface 36b of the stepped portion 36a, there is no possibility that this distance b can exceed the thickness c of the thrust needle roller bearing 45. This makes it possible to positively prevent the thrust needle roller bearing 45 from slipping off from between the outer surface 41 of the outer ring 41 and the stepped portion 36a of the support plate portion 36. As a result of this, not only the assembling efficiency of the toroidal-type continuously variable transmission can be enhanced but also the lower efficiency of the power transmission in the power roller unit 50 can be prevented.

Further, since no slippage of the thrust needle roller bearing 45 eliminates the need for provision of a member for prevention of the slippage of the thrust needle roller bearing 45 in transportation of the power roller unit 50, the transportation cost of the power roller unit 50 can be reduced.

Also, because the distance a between the small end face 39a of the power roller 39 and the inner surface 38a of the connecting member 38 and the distance b between the outer surface 41a of the outer ring 41 and the opposed surface 36 of the stepped portion 36a are set so as to have the relation a>b, the space between the small end face 39a of the power roller 39 and the inner surface 38a of the connecting member 38 can be widened. This can improve the flow of lubricating oil and thus can enhance the efficiency of the power transmission in the power roller unit 50.

Figure 2:
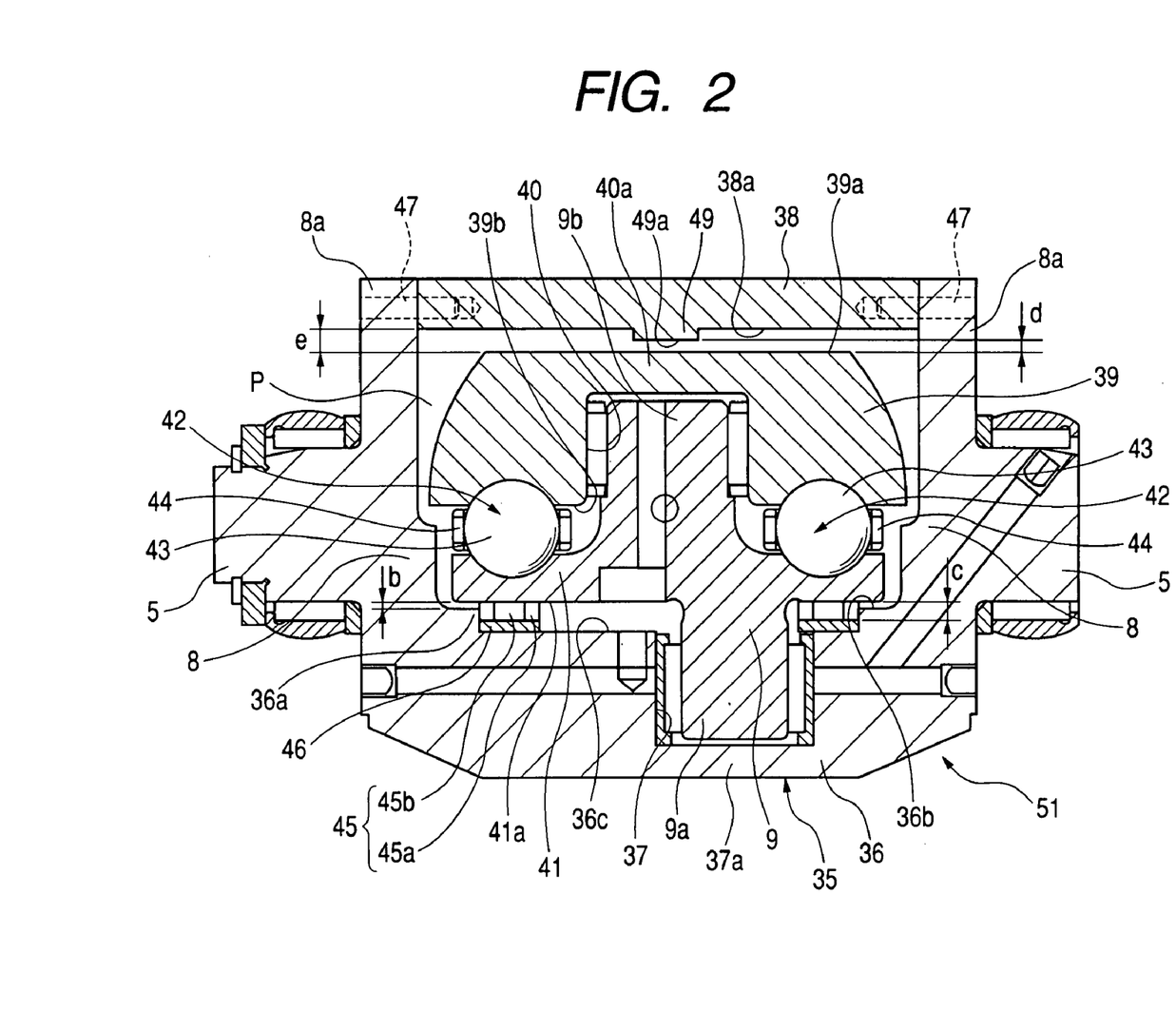
FIG. 2 is a section view of a power roller unit for a toroidal-type continuously variable transmission according to a second embodiment of the present invention.

Now, FIG. 2 shows a second embodiment of a power roller unit for a toroidal-type continuously variable transmission according to the present invention. By the way, in FIG. 2, like composing elements as those shown in FIG. 1 are given the same designations and thus the description thereof is simplified here.

As shown in FIG. 2, in a power roller unit 51 for a toroidal-type continuously variable transmission according to the second embodiment, at the position of a connecting member 38 that is opposed to the center portion of the rotation of the power roller 39, there is disposed a projecting portion 49 which projects toward the small end face 39a of the power roller 39 in such a manner that it is integral with the connecting member 38.

In the present power roller unit 51, the sum of the distance d between the small end face 39a of the power roller 39 and the opposed surface 49a of the projecting portion 49 of the connecting member 38 that is opposed to the inner surface of the power roller 39 and the distance b between the outer surface 41a of the outer ring 41 and the opposed surface 36b of the stepped portion 36a is set smaller than the thickness c of the thrust needle roller bearing 45 (d+b>c). Also, the distance d is set larger than the distance b (d<b).

In the case of the thus-structured power roller unit 51 for a toroidal-type continuously variable transmission, because there can be obtained a similar operation effect to the first embodiment and also because the projecting portion 49 projecting toward the small end face 39a of the power roller 39 is disposed in the connecting member 38, the distance e between the small end face 39a of the power roller 39 and the other portions of the inner surfaces 38a of the connecting member 38 than the projecting portion 49 increases, which can increase the space between these surfaces. Therefore, the flow of lubricating oil around the power roller 39 rotating at a high speed can be improved and thus the power transmission efficiency in the power roller unit 51 can be enhanced.

Also, since the projecting portion 49 of the connecting member 38 is disposed at such a position that is opposed to the center portion of the rotation of the power roller 39, the space between the outer periphery of the small end face 39$a$ of the power roller 39 and the connecting member 38 can be widened. This can further improve the flow of the lubricating oil around the power roller 39, so that the power transmission efficiency of the power roller unit 51 can be enhanced further.

By the way, it goes without saying that the present invention is not limited to the above-mentioned embodiments but it can be enforced in other various manners without departing from subject matter of the present invention. For example, in the first embodiment, the distance a between the small end face 39$a$ of the power roller 39 and the inner surface 38$a$ of the connecting member 38 and the distance b between the outer surface 41$a$ of the outer ring 41 and the opposed surface 36 of the stepped portion 36$a$ are set so as to have the relation a>b; however, instead of this, the distances a and b may also be set to have the relation a<b.

Similarly, in the second embodiment as well, the distance d between the small end face 39$a$ of the power roller 39 and the opposed surface 49$a$ of the projecting portion 49 of the connecting member 38 and the above-mentioned distance b may also be set so as to have the relation d<b.

Also, in the respective illustrated embodiments, as the thrust bearing, there is used the thrust needle roller bearing 45 which belongs to a rolling bearing; however, instead of this, a sliding bearing may also be used.

Also, in the second embodiment, the projecting portion 49 is disposed at the position of the connecting member 38 that is opposed to the center portion of the rotation of the power roller 39; however, in place of this, the projecting portion 49 may also be disposed at the position of the connecting member 38 that is opposed to the vicinity of the outer peripheral portion of the small end face 39$a$ of the power roller 39. In short, the projecting portion 49 may be disposed at least in a portion of the connecting member 38 that is opposed to the small end face 39$a$ of the power roller 39.

As has been described heretofore, according to the present invention, there can be provided a power roller unit for a toroidal-type continuously variable transmission which not only can enhance the assembling efficiency of a toroidal-type continuously variable transmission but also can prevent the efficiency of the power transmission of the power roller unit from being lowered.

What is claimed is:

1. A power roller unit for a toroidal-type continuously variable transmission, comprising:
   a trunnion including a support plate portion, a pair of bent wall portions formed in the two end portions of the support plate portion, two pivot shafts concentrically disposed on the outer surfaces of the two bent wall portions, and a connecting member for connecting together the pair of bent wall portions;
   a displacement shaft supported on the support plate portion;
   a power roller including a large end face and a small end face and supported rotatably on the displacement shaft;
   a thrust ball bearing including an outer ring interposed between the large end face of the power roller and the support plate portion, a plurality of ball interposed between the large end face of the power roller and the outer ring, and a retainer for holding the balls therein;
   a thrust bearing interposed between the outer ring and the support plate portion and, while supporting a thrust-direction load applied to the trunnion from the power roller, allowing the power roller to swing,
   wherein a thrust bearing is held by a hold portion disposed in the support plate portion, and
   wherein, where the distance between the small end face of the power roller and the connecting member is expressed as a, the distance between the outer ring and the opposed surface of the hold portion opposed to the outer ring is expressed as b, and the thickness of the thrust bearing is expressed as c, the sum of a and b is set smaller than c.

2. A power roller unit for a toroidal-type continuously variable transmission as set forth in claim 1, wherein the distance a is set larger than the distance b.

3. A power roller unit for a toroidal-type continuously variable transmission as set forth in claim 1, wherein the connecting member includes a projecting portion projecting toward the small end face of the power roller.

4. A power roller unit for a toroidal-type continuously variable transmission as set forth in claim 3, wherein the projecting portion of the connecting member is disposed at a position opposed to the center portion of the rotation of the power roller.

5. A power roller unit for a toroidal-type continuously variable transmission as set forth in claim 1, wherein the outer ring is formed integrally with the displacement shaft.

* * * * *